(12) United States Patent
Shutrump

(10) Patent No.: US 8,438,857 B2
(45) Date of Patent: May 14, 2013

(54) AIRCRAFT ENGINE INLET HAVING ZONE OF DEFORMATION

(75) Inventor: Jeffrey D. Shutrump, Chula Vista, CA (US)

(73) Assignee: Rohr, Inc., Chula Vista, CA (US)

(*) Notice: Subject to any disclaimer, the term of this patent is extended or adjusted under 35 U.S.C. 154(b) by 0 days.

(21) Appl. No.: 12/755,589

(22) Filed: Apr. 7, 2010

(65) Prior Publication Data
US 2011/0167606 A1 Jul. 14, 2011

Related U.S. Application Data

(62) Division of application No. 11/488,980, filed on Jul. 19, 2006, now Pat. No. 7,721,525.

(51) Int. Cl.
*F02C 1/00* (2006.01)

(52) U.S. Cl.
USPC .......... 60/772; 60/226.1; 244/53 B; 137/15.1; 415/215.1

(58) Field of Classification Search .................. 60/772, 60/226.1, 796, 797; 244/543 B; 415/213.1, 415/214.1, 215.1; 416/189, 190, 192; 137/15.1; 29/889.2
See application file for complete search history.

(56) References Cited

U.S. PATENT DOCUMENTS

| | | |
|---|---|---|
| 4,749,150 A | 6/1988 | Rose et al. |
| 4,759,513 A | 7/1988 | Birbragher |
| H648 H | 7/1989 | Tran |
| 5,054,281 A | 10/1991 | Mutch |
| 5,225,016 A | 7/1993 | Sarh |
| 5,350,136 A | 9/1994 | Prosser et al. |
| 5,372,338 A | 12/1994 | Carlin et al. |
| 5,497,961 A | 3/1996 | Newton |
| 5,581,054 A | 12/1996 | Anderson et al. |
| 5,740,674 A | 4/1998 | Beutin et al. |
| 5,743,488 A | 4/1998 | Rolston et al. |
| 5,768,778 A | 6/1998 | Anderson et al. |
| 5,941,061 A | 8/1999 | Sherry et al. |
| 6,032,901 A | 3/2000 | Carimali et al. |
| 6,220,546 B1 | 4/2001 | Klamka et al. |
| 6,328,258 B1 | 12/2001 | Porte |
| 6,340,135 B1 | 1/2002 | Barton |

(Continued)

FOREIGN PATENT DOCUMENTS

| | | |
|---|---|---|
| EP | 1 176 089 A2 | 1/2002 |
| EP | 1 176 089 A3 | 1/2002 |
| GB | 1 427 339 | 3/1976 |

OTHER PUBLICATIONS

International Search Report and Written Opinion (Appln. No. PCT/US2007/072710), mailed Aug. 13, 2008, pp. 1-14.

(Continued)

*Primary Examiner* — Phutthiwat Wongwian
(74) *Attorney, Agent, or Firm* — Womble Carlyle

(57) ABSTRACT

An inlet assembly for an aircraft engine nacelle includes an inner barrel, an outer barrel radially spaced from the inner barrel, and a rear support for supporting the outer barrel relative to the inner barrel. The rear support includes at least one radially extending stiffener and at least one energy absorber defining a zone of deformation adjacent the inner barrel. The rear support is deformable in the zone of deformation in response to forces applied during a fan blade-out event to prevent fracture of the rear support.

8 Claims, 6 Drawing Sheets

U.S. PATENT DOCUMENTS

| | | |
|---|---|---|
| 6,708,711 B2 | 3/2004 | Surply et al. |
| 6,920,958 B2 * | 7/2005 | Harrison ............ 181/214 |
| 2004/0255572 A1 | 12/2004 | Porte |
| 2005/0218261 A1 | 10/2005 | Porte et al. |
| 2005/0269443 A1 | 12/2005 | Porte |
| 2007/0295011 A1 | 12/2007 | Suciu et al. |

OTHER PUBLICATIONS

Extended Search Report for EP Application No. 11000622.8, dated Jul. 9, 2012, 4 pgs.

* cited by examiner

AIRCRAFT ENGINE INLET HAVING ZONE OF DEFORMATION

RELATED APPLICATIONS

This application is a divisional of U.S. application Ser. No. 11/488,980 filed Jul. 19, 2006, the content of which is incorporated by reference in its entirety.

FIELD OF THE INVENTION

The present invention generally relates to gas turbine engines, and more specifically to an inlet assembly for an aircraft engine nacelle having a rear support with an energy absorbing zone.

BACKGROUND OF THE INVENTION

One type of jet engine typically used on large commercial airliners is a turbofan jet engine. Such turbofan engines have a compressor, combustor and turbine, and include a fan mounted on the front of the engine. These fans, some as large as 10 feet in diameter, draw air into the engine. Some of the air is sent to the compressor and the combustor, while the rest bypasses these components through ducts along the outside of the engine. The fans include fan blades that rotate at speeds up to approximately 9,000 rpm during operation of the engine and are enclosed in a fan housing that radially surrounds the fan. Turbofan engines for airliners typically include a nacelle that at least partially surrounds the engine and provides an aerodynamic shell to minimize drag. Typical nacelles generally comprise an inlet assembly located in front of the fan, generally being attached to the fan housing and shaped to direct air into the engine, a fan cowl that encloses the fan, and a thrust reverser adjacent the rear part of the engine.

The inlet assemblies for turbofan jet engine nacelles typically include an inner barrel, an outer barrel, a forward bulkhead, and an aft bulkhead which spans between the inner and outer barrel. Typically, the aft bulkhead is an annular metal plate that is designed to fracture during the initial (albeit extremely unlikely) impact of a fan blade-out event or during the subsequent loads from the windmilling effect of the unbalanced fan. During a fan blade-out event, the fan blade impacts the fan housing at a high rate of speed generating a large impact force that is transmitted from the fan housing to the inlet assembly attached to the housing. After a fan blade-out event, the engine is shut down but the fan can continues to rotate or "windmill" as the plane is flown to a destination for repair. However, the fan is generally unbalanced and thus continued rotation of the fan can cause high loads on the fan housing. The bulkhead thus generally is reinforced with a series of structural support members extending between the inner barrel and outer barrel and connected to the bulkhead at spaced apart locations. In existing designs, the support members are spaced such that the inlet remains intact with the bulkhead being held together by the support members. The use of structural support members on the aft bulkheads of prior art inlet assemblies, however, increases the weight and cost of the nacelle.

Accordingly, there is a need for a nacelle for a turbofan jet engine having an inlet assembly that addresses the foregoing and other related and unrelated problems in the art.

SUMMARY OF THE INVENTION

In general, one aspect of the present invention is generally directed to an inlet assembly for a turbofan engine nacelle comprising an inner barrel, an outer barrel radially spaced from the inner barrel, and a rear support for supporting the outer barrel relative to the inner barrel. The rear support comprises at least one plate extending between the inner barrel and the outer barrel for forming a closed axial end of the inlet assembly. The plate has at least one stiffener extending radially across the plate and at least one energy absorber formed in the plate. The energy absorber defines a zone of deformation adjacent the inner barrel. The rear support is deformable in the zone of deformation in response to an applied force during a fan blade-out event to prevent fracture of the rear support.

In another aspect, the present invention is generally directed to a method of manufacturing an inlet assembly for an aircraft engine nacelle having an outer barrel and an inner barrel. The method comprises forming at least one radial stiffener in a rear support and forming at least one zone of deformation in the rear support by forming an arcuately extending energy absorber. The energy absorber is located in the rear support such that the support is deformable in the zone of deformation in response to an applied force during a fan blade-out event to prevent fracture of the rear support. The rear support is attached to the outer barrel and the inner barrel to form a closed axial end of the inlet assembly.

In yet another aspect, the present invention is generally directed to a nacelle for a turbofan engine. The nacelle comprises an inlet assembly having an inner barrel, an outer barrel radially spaced from the inner barrel, and a rear support for supporting the outer barrel relative to the inner barrel. The rear support comprises at least one annular plate extending between the inner barrel and the outer barrel for forming a closed axial end of the inlet assembly. The plate has at least one stiffener extending radially across the plate and an energy absorber formed in the plate. The energy absorber defines a zone of deformation adjacent the inner barrel. The rear support is deformable in the zone of deformation in response to an applied force during a fan blade-out event to prevent fracture of the rear support.

Various objects, features and advantages of the present invention will become apparent to those skilled in the art upon reading the following detailed description, when taken in conjunction with the accompanying drawings.

DETAILED DESCRIPTION OF THE INVENTION

Figure 1:
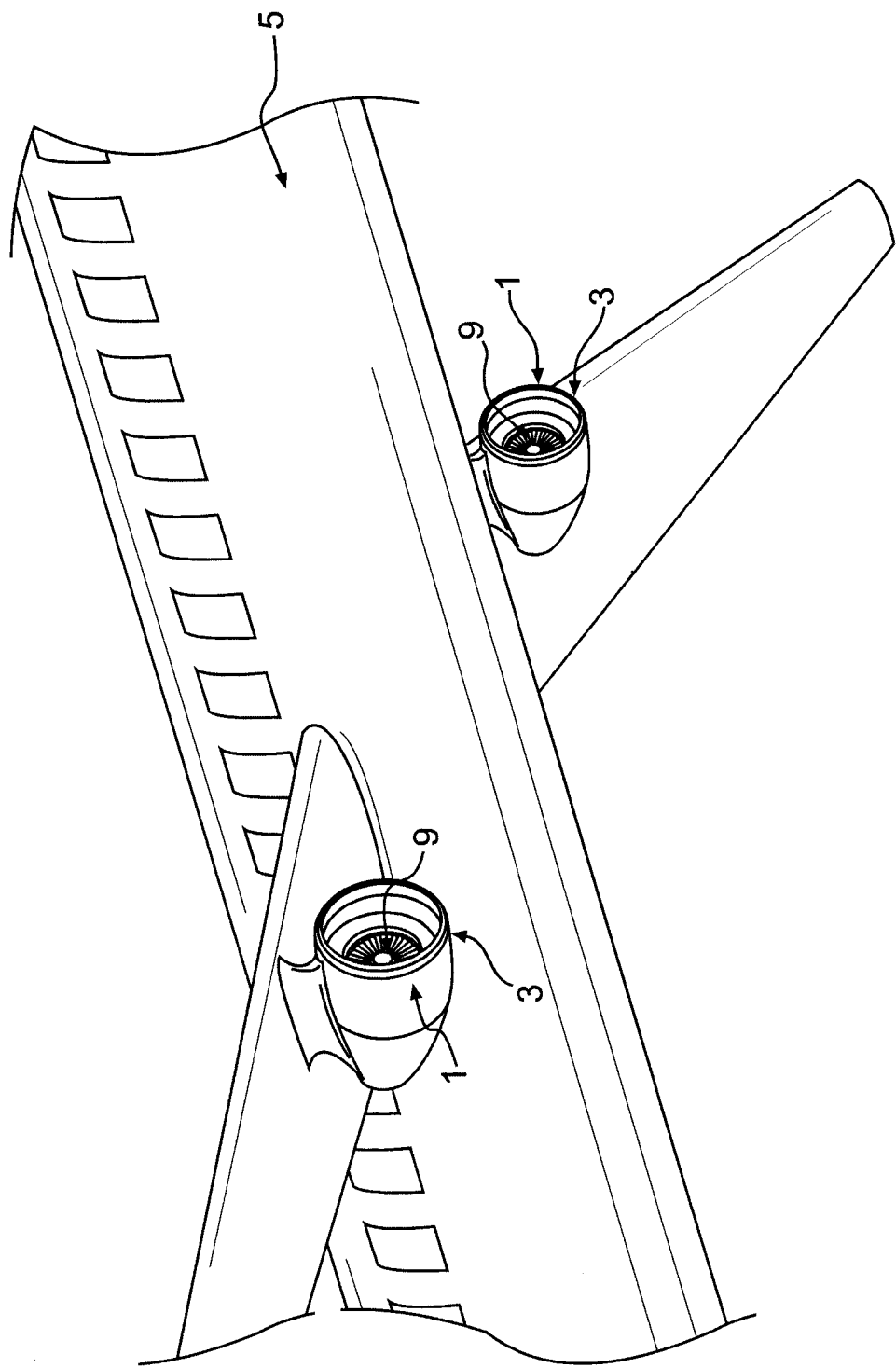
FIG. 1 is a partial perspective view of an aircraft having turbofan jet engines each with a nacelle according to a first embodiment of the invention.
Figure 2:
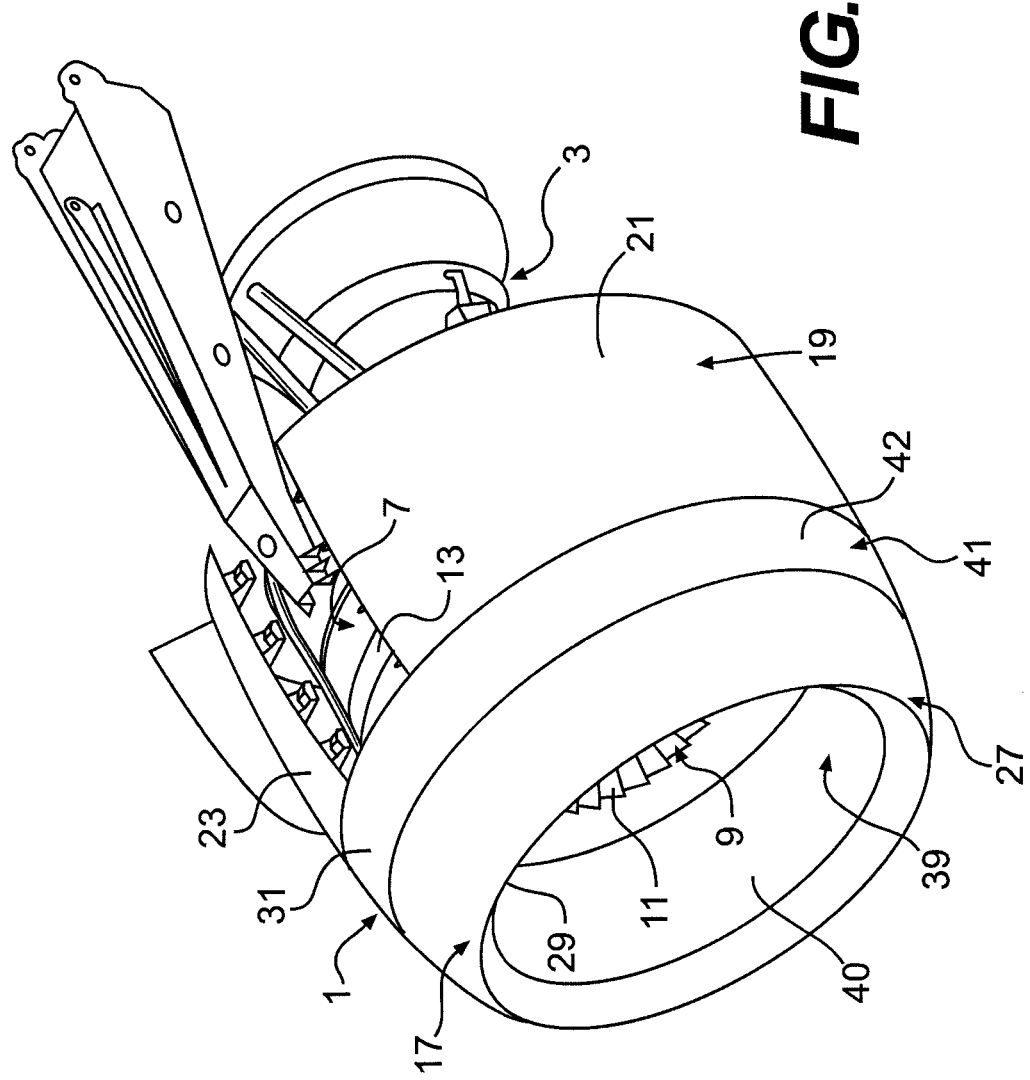
FIG. 2 is a perspective of an aircraft turbofan jet engine and nacelle structure.

Referring now to the drawings in which like numerals indicate like parts throughout the several views, the present invention generally relates to a nacelle, generally indicated at 1 in FIG. 1, for a turbofan jet engine 3, mounted on an aircraft 5. As shown in FIG. 1, the nacelle 1 encloses the engine 3 and forms the outer aerodynamic covering of the engine. As shown in FIG. 2, the turbofan jet engine 3 includes a fan assembly, generally indicated at 7, located towards the front of the engine and having a fan 9 having fan blades 11 rotatably mounted in a fan housing 13 of the engine. It is understood that the nacelle 1 is only partially shown in FIG. 2 and includes an inlet assembly 17, mounted on the front of the fan assembly 7 and a fan cowl 19, including doors 21, 23 that enclose the fan assembly. It further is understood that the nacelle 1 may include other components and systems not shown in the illustrated embodiments (e.g., thrust reverser and de-icing system) without departing from the scope of this invention.

Figure 3:
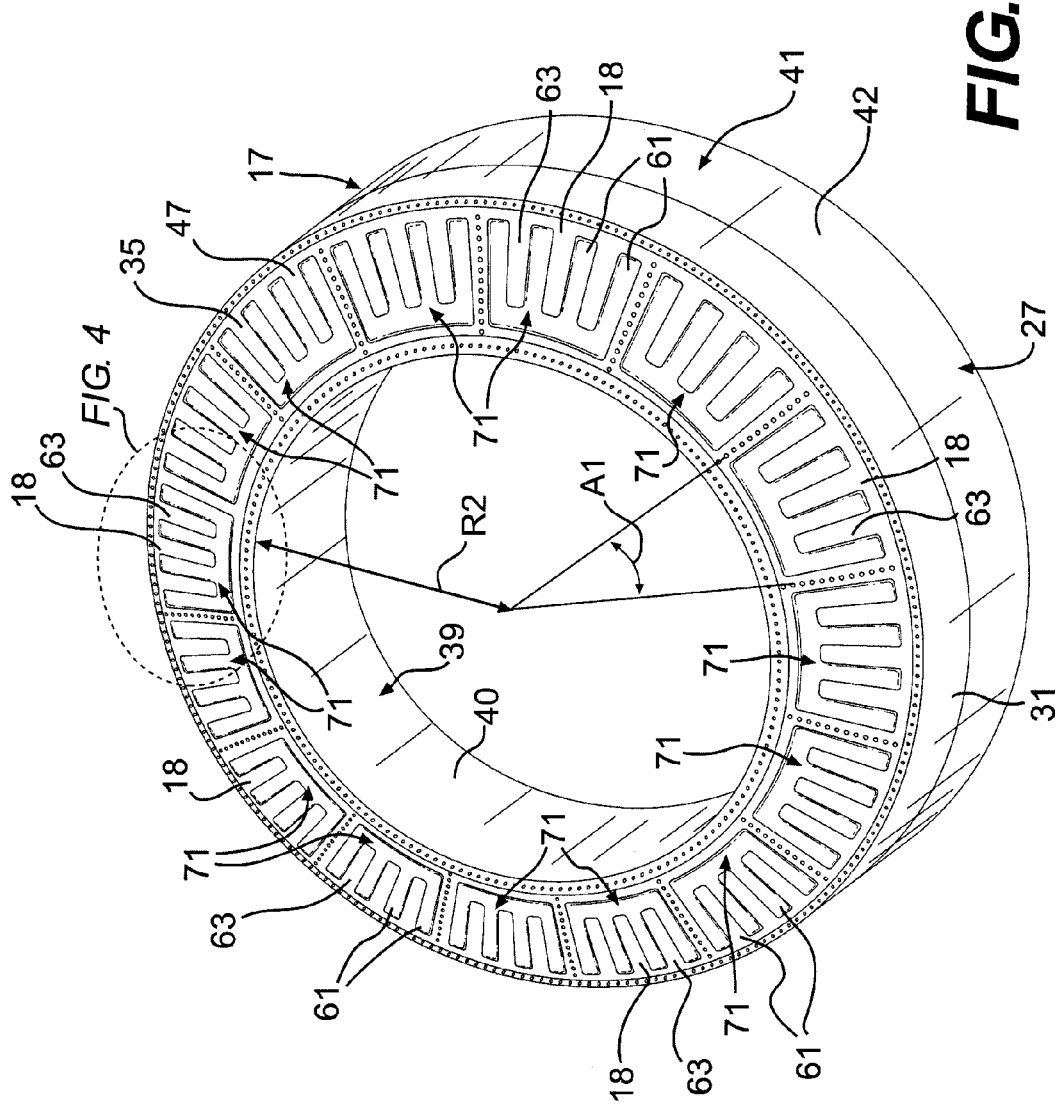
FIG. 3 is a perspective of an inlet assembly of an aircraft turbofan jet engine nacelle, as viewed from a back-to-front perspective.
Figure 5:
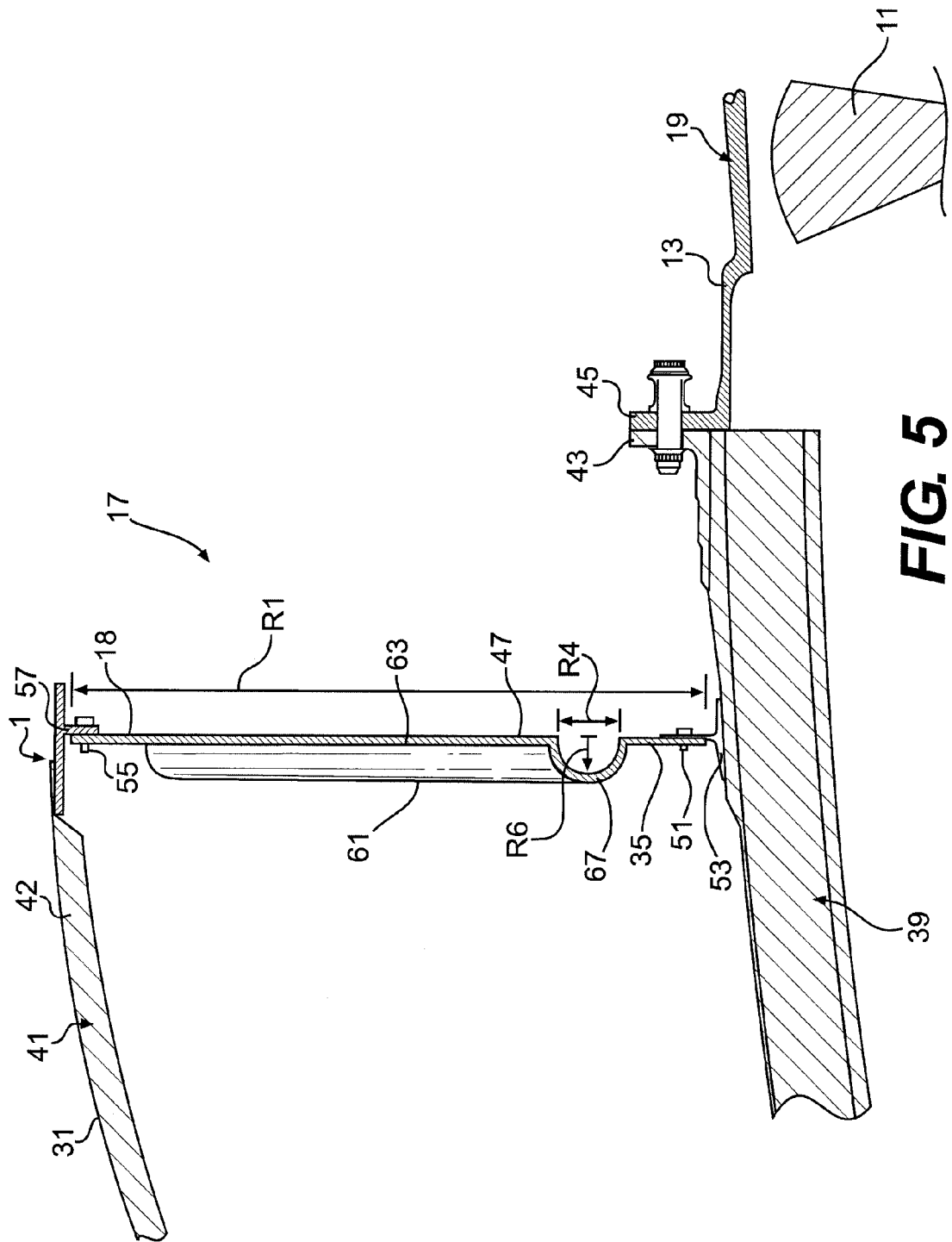
FIG. 5 is a cross-sectional view of the inlet assembly taken along the plane including line 5-5 of FIG. 4.

As shown in FIG. 2, the inlet assembly 17 includes a leading edge section 27 that includes a forward lip 29 shaped to provide a natural airflow along the forwardmost surfaces of the engine 3. The inlet assembly 17 has a rear body 31 that is connected to the rear of the leading edge section 27 and the front of the fan cowl 19, and includes a rear support 35 (FIG. 3). The inlet assembly 17 further includes an inner barrel 39, forming an inner radial surface 40 of the inlet assembly, and an outer barrel 41. The outer barrel 41 is radially spaced from the inner barrel 39 and forms an outer radial surface 42 of the inlet assembly. The outer barrel 41 is formed by adjacent outer radial walls of the leading edge assembly 27 and the rear body 31. As shown in FIG. 5, the inner barrel 39 has a flange 43 at the rear of the rear body 31 for connecting to a corresponding flange 45 on the fan housing 13. The connection of the inner barrel 39 to the fan housing 13 enables impact forces imparted against the fan housing to be transmitted to the inlet assembly 17 via the connected flanges 43, 45.

Figure 4:
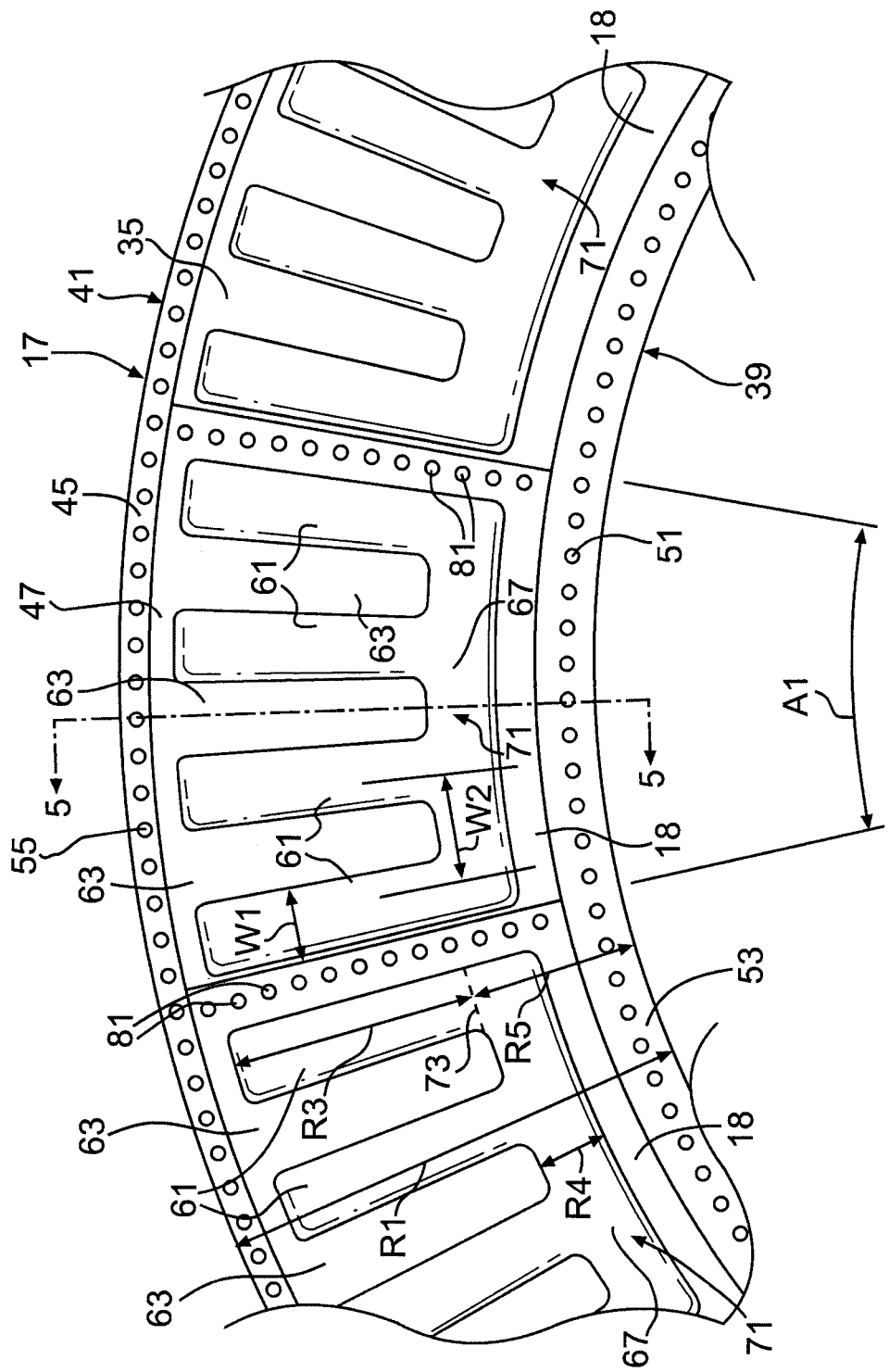
FIG. 4 is and end view of an enlarged portion of the inlet assembly FIG. 3.

The rear support 35 forms a closed axial end of the inlet assembly 17 and supports the outer barrel 41 relative to the inner barrel 39 as indicated in FIG. 3. As shown in FIGS. 3-5, the rear support 35 generally is a plate 47 formed from or having multiple sections or segments 18. Each section 18 of the rear support 35 has a series of circumferentially spaced ribs 61 extending radially in the plate to increase the sonic resistance of the support 35 and stiffeners 63 between the ribs 61 that increase the stiffness of the support 35. Energy absorbers 67 extend arcuately in the support 35 to form annularly spaced zones of deformation 71 adjacent the inner barrel 39. In the illustrated embodiment, the ribs 61 each have an inner radial edge 73 (FIG. 4) that is adjacent the radial outer edge 75 of an energy absorber 67. In one embodiment, and as shown in FIG. 5, each rib 61 is formed by creating a semicircular depression in the annular plate 47. The stiffeners 63 comprise the flat surface area of the plate between adjacent ribs 61 and the energy absorber 67. In the illustrated embodiment, each segment 18 of the support 35 comprises four ribs 61, three stiffeners 63, and one energy absorber 67.

In the illustrated embodiment, and as shown in FIG. 5, each energy absorber 67 is an arcuate rib comprising a semicircular depression in the plate 47. At each zone of deformation 71, a respective energy absorber 67 is deformable in response to an applied force transmitted from the fan housing 13 during a fan blade-out event to prevent fracture of the rear support 35. Each zone of deformation 71 acts as a crumple zone that absorbs the impact energy transmitted from the fan housing 13 and allows the rear support 35 to deform in response to the energy. Because the rear support 35 deforms in the zone of deformation 71, the rear support 35 is prevented from cracking or otherwise fracturing in response to the impact force from the fan housing 13 during a fan blade out event and the resulting force imparted on the rear support 35 during the subsequent windmilling of the unbalanced fan 9. In the illustrated embodiment, each radial rib 61 and arcuate rib 67 is a semi-circular depression, but it is understood that each rib may have other cross-sectional shapes such as curves having a varying radius of curvature and/or portions that are substantially flat.

In the illustrated embodiment, the rear support 35 has a material thickness of approximately 0.080 inches and a radial length R1 (FIGS. 4 and 5) of approximately 14 inches, and an inner radius R2 (FIG. 3) of approximately 57 inches. Each rib 61 has a radial length R3 (FIG. 4) of approximately 9 inches, a width W1 of approximately ¾ inch to approximately 2½ inches, and a spacing W2 between adjacent ribs of approximately 6 inches. Each energy absorber 67 has a radial length R4 (FIG. 4) of approximately ¾ inch to approximately 2½ inches with the outer radial edge of the energy absorber being spaced from the inner radial edge of the rear support 35 a radial length R5 of approximately 3 inches. The energy absorbers 67 and ribs 61 have a radius R6 (FIG. 5) of approximately half the length R4 and may generally be in the range of approximately ⅜ inch to approximately 1¼ inches. The dimensional information described herein is intended to illustrative of one embodiment of the invention and should not be construed as limiting the scope of the invention because the dimensions of the invention may vary from the dimensions and ranges described herein without departing from the scope of this invention. In the illustrated embodiment, each zone of deformation 71 is defined by an angular section of the rear support 35 including four ribs 61 and three stiffeners 63 connected by one energy absorber 67 with each angular section having an angle A1 (FIGS. 3 and 4) of approximately 20 degrees. It is understood that the number of stiffeners 63, ribs 61, and energy absorbers 67 of each zone of deformation 71 may vary and that the angle Al may be more or less than 20 degrees without departing from the scope of this invention.

The multiple sections 18 of the rear support 35 are attached at an inner radial edge to the inner barrel 39 by fasteners 51 connecting the rear support 35 to a flange 53 mounted on the external surface of the inner barrel 39 forward of the rear flange 43 connecting the inlet assembly to the fan housing 13. The sections 18 of the rear support 35 are attached at an outer radial edge to the outer barrel 41 by fasteners 55 connecting the rear support 35 to a flange 57 mounted on inner surface of the outer barrel 41 at the rear axial end of the outer barrel 41. The forces (e.g., impact forces, vibration forces, etc.) exerted on the fan housing 13 during operation of the engine 3 are transferred to the inner barrel 39 and to the rear support 35 attached to the inner barrel along the flange 53.

As shown in FIG. 4, adjacent sections 18 of the rear support 35 are connected by fasteners 81 extending through overlapping adjacent edge margins of the adjacent sections. Each section 18 of the rear support 35 may be manufactured by conventional fabrication processes such as metal casting or hydroforming with the curved radial ribs 61 and the curved arcuate rib of the energy absorbers 67 preformed in the molding used to cast each section. In the embodiment of FIGS. 3-5, the rear support 35 is made from 2024-T4 Aluminum but it is understood that the support could be made from other suitable materials and variations thereof (e.g., titanium, steel, CRES, Inconel, etc.). Material selection is based on numerous factors including environmental conditions, weight, cost, and design conditions. As shown in FIG. 5, the rear support 35 is generally vertical between the inner barrel 39 and outer barrel 41. It is understood that in alternative embodiments, the rear support 35 could be positioned at an angle up to approximately 45 degrees in the forward or aft direction without departing from the scope of this invention.

The rear support 35 of the inlet assembly 17 of the present invention is designed to withstand the high stress and strain imparted to the inlet assembly from the fan housing 13 during a fan blade-out event. During a fan blade-out event, a fan blade 11 becomes partially or fully detached from the fan 9 and may impact the fan housing 13 causing a large initial impact force to be transmitted to the inlet assembly 17. As a result of such impact, the fan 9 may become unbalanced and continue to rotate or windmill during subsequent flight of the aircraft 5. The rotation of the unbalanced fan 9 exerts further stress and strain on the fan housing 13 which is transmitted to the inner barrel 39 and rear support 35 of the inlet assembly 17. The zones of deformation 71 of the rear support 35 are designed to absorb the forces from the fan housing 13 during a fan blade-out event without fracture of the rear support. The energy absorbers 67 absorb the energy and allow the rear support 35 to deform in the zone of deformation 71 in response to the impact forces during the fan blade-out event. Deformation of the rear support 35 in the zone of deformation 71 allows the rear support to withstand the fan blade-out event without fracture of the support or failure of the fasteners 51, 55 attaching the support to the inner barrel 39 and the outer barrel 41. In this way, the structural integrity of the rear support 35 is maintained during a fan blade-out event so that the inlet assembly 17 stays intact and no parts are broken off or discharged from the aircraft 5.

Figure 6:
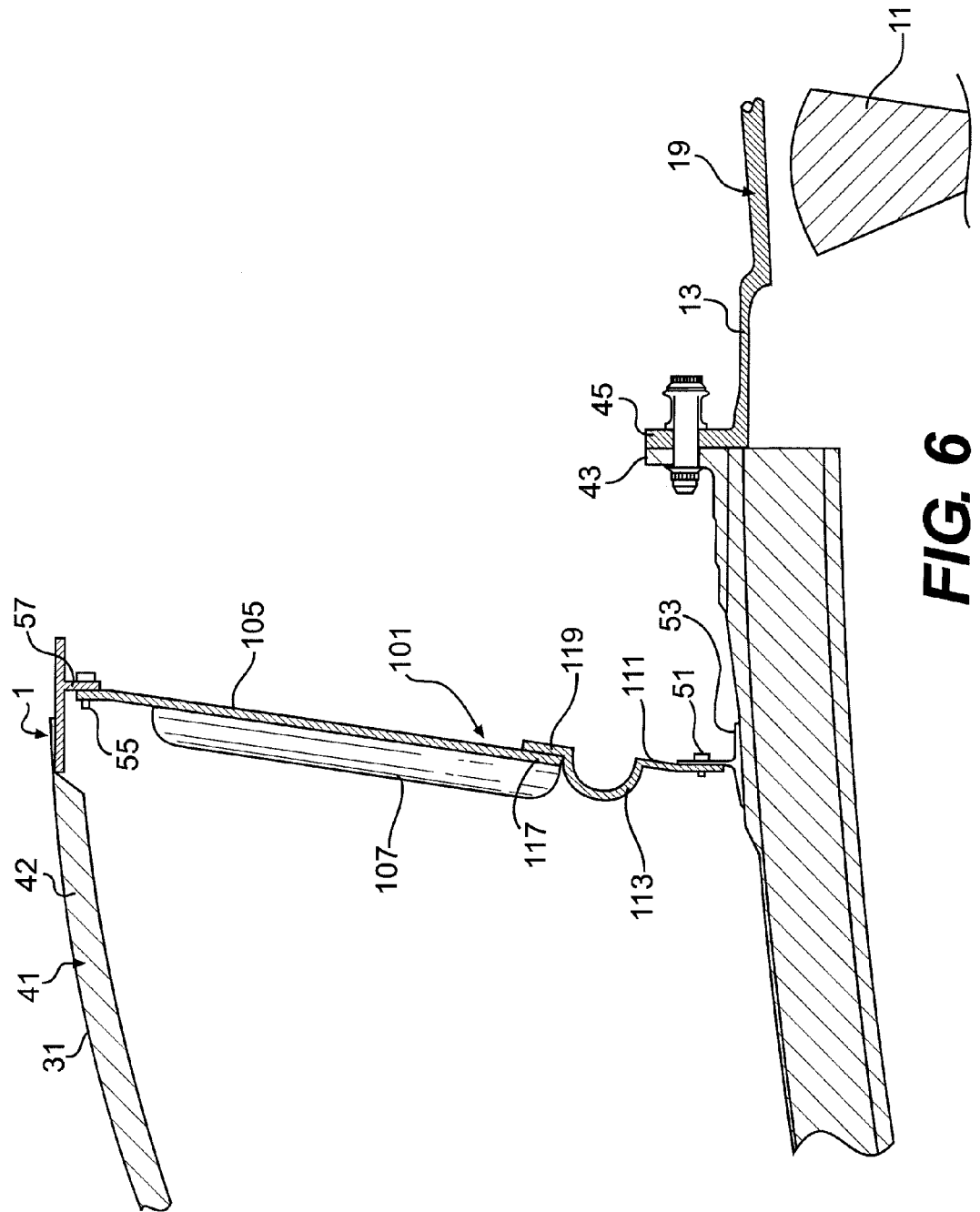
FIG. 6 is a partial cross-sectional view of an inlet assembly of a second embodiment of the invention.

FIG. 6 shows a second embodiment of the inlet assembly including a rear support 101 that is designed to act as a firewall in the engine assembly. In the illustrated embodiment of FIG. 6, the rear support 101 has a composite material outer radial portion 105 made of a heat resistant material (e.g., graphite composite) and a metallic inner radial portion 111 made of a deformable metal (e.g., aluminum). Alternatively, the rear support 101 could have a metallic inner radial portion and a metallic outer radial portion; a composite material inner radial portion and a composite material outer radial portion; or a composite material inner radial portion and a metallic outer radial portion, without departing from the scope of this invention.

The outer radial portion 105 has ribs 107 and stiffeners (not shown) between the ribs 107 as in the first embodiment and the inner radial portion 111 includes energy absorbers 113 similar to the energy absorbers 67 of the first embodiment. The ribs 107, energy absorbers 113, and stiffeners are configured in a similar manner as described above for the first embodiment to form angularly spaced zones of deformation in the rear support 101. The inner radial portion 111 can have an outer heat resistant layer covering the deformable metal to make the inner portion of the rear support 101 resistant to heat. In the illustrated embodiment the inner radial portion 111 and the outer radial portion 105 are joined at respective overlapping portions 117, 119. The overlapping portions 117, 119 are attached by threaded fasteners (not shown) or other suitable methods (e.g., rivets, welding, etc.). The rear support 101 shown in FIG. 6 is angled towards the aft direction, however, the rear support may be otherwise positioned (e.g., vertical, angled in forward direction, etc.) without departing from the scope of this invention.

It is understood that zones of deformation of this embodiment function in a similar manner as the first embodiment in that the rear support 101 deforms at the zones of deformation during a fan blade-out event. As with the first embodiment, the rear support 101 is designed to deform without fracturing or shearing at the fasteners during the fan blade-out event.

In view of the above, it will be seen that several advantageous results are obtained by the inlet assembly of the present invention. For example, the inlet assembly 17 having the rear support 35 is lightweight yet capable of withstanding the high stresses and strains during a fan blade-out event. The rear support 35 is designed to deform in the zone of deformation 71 which acts as a crumple zone during a fan blade-out event so that the rear support remains assembled in one piece without fracturing or breaking off during flight. Further, the rear support 101 of the inlet assembly 17 may be designed to act as a firewall with an outer radial portion 105 made of heat resistant material such as graphite composite and an inner radial portion 111 including the zone of deformation that is made of a deformable metal such as aluminum.

It will be further understood by those skilled in the art that while the foregoing has been disclosed above with respect to preferred embodiments or features, various additions, changes, and modifications can be made to the foregoing invention without departing from the spirit and scope thereof.

What is claimed is:

1. A method of manufacturing an inlet assembly for an aircraft engine nacelle having an outer barrel and an inner barrel, said method comprising:

forming a plurality of circumferentially spaced radial ribs and at least one radial stiffener in an annular rear support;

forming at least one zone of deformation in said annular rear support by forming at least one arcuately extending energy absorber in said annular rear support, said energy absorber being located in said annular rear support such that said annular rear support is deformable in said zone of deformation in response to an applied force during a fan blade-out event to prevent fracture of said rear support, wherein said plurality of circumferentially spaced radial ribs extend radially outward from said at least one energy absorber; and attaching said annular rear support to the outer barrel and the inner barrel to form a closed axial end of the inlet assembly.

2. The method of claim 1 wherein forming said at least one zone of deformation in said annular rear support comprises forming a plurality of zones of deformation angularly spaced around said annular rear support.

3. The method of claim 2 wherein attaching said rear support comprises attaching a plurality of angular sections of said annular rear support to said inner and said outer barrel, each of said plurality of angular sections comprising at least one zone of deformation of said plurality of zones of deformation.

4. The method of claim 1 wherein forming said at least one arcuately extending energy absorber comprises forming a curved rib generally adjacent an inner radial edge of at least one of said plurality of circumferentially spaced radial ribs.

5. The method of claim 4 wherein forming said at least one radial stiffener comprises forming at least two of said plurality of circumferentially spaced radial ribs on a generally flat portion of said annular rear support, the at least one radial stiffener comprising a flat surface of said annular rear support between said at least two of said plurality of circumferentially spaced radial ribs.

6. The method of claim 5 wherein said annular rear support comprises an inner radial portion made of metal and said energy absorber is formed in the inner radial portion.

7. The method of claim 6 wherein said annular rear support comprises an outer radial portion made of a composite material and said at least one radial stiffener is formed in the outer radial portion.

8. The method of claim 7 further comprising attaching said inner radial portion to said outer radial portion.

* * * * *